No. 852,691. PATENTED MAY 7, 1907.
H. E. ADAMS.
CABLE BONDING DEVICE.
APPLICATION FILED MAR. 12, 1906.
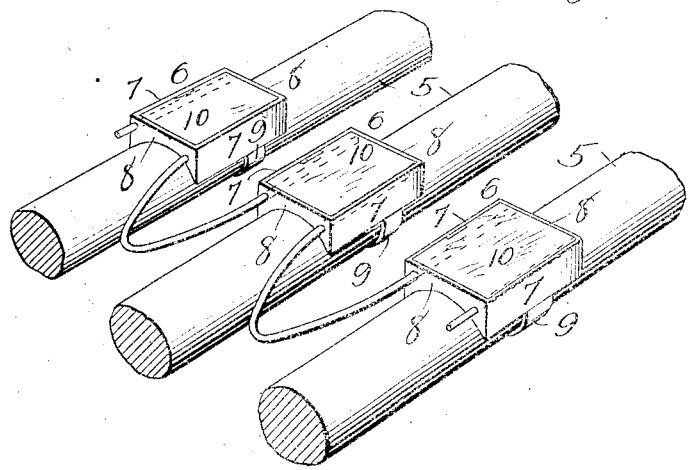
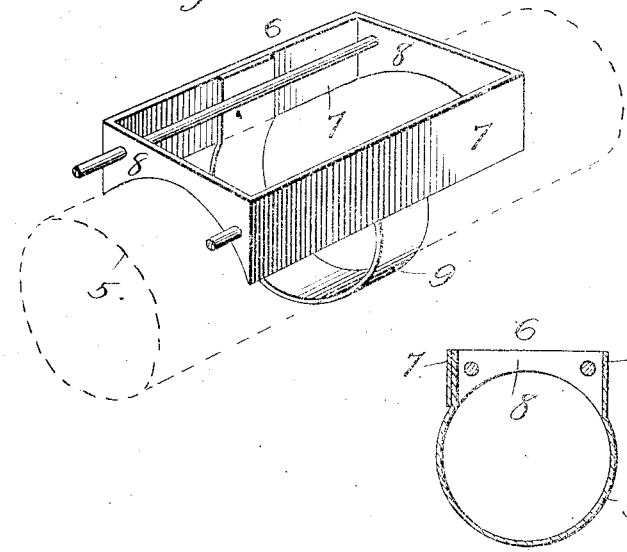
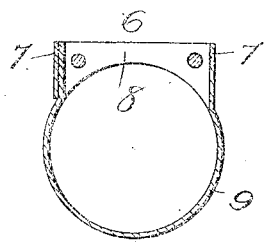
Witnesses
Carl Stoughton
A. L. Phelps
Inventor
Harry E. Adams
by Frank G. Campbell
his Attorney

UNITED STATES PATENT OFFICE.

HARRY E. ADAMS, OF PITTSBURG, PENNSYLVANIA.

CABLE-BONDING DEVICE.

No. 852,691.  Specification of Letters Patent.  Patented May 7, 1907.

Application filed March 12, 1906. Serial No. 305,564.

*To all whom it may concern:*

Be it known that I, HARRY E. ADAMS, a citizen of the United States, residing at Pittsburg, in the county of Allegheny and State of Pennsylvania, have invented certain new and useful Improvements in Cable-Bonding Devices, of which the following is a specification.

My invention relates to a device for bonding cables and has for its object the provision of a device of this character adapted to readily connect electric cables when it is desired to establish electrical communication between them, or to connect bridge or like cables when it is desired to bond them for the prevention of electrolysis.

By the method usually adopted for the purpose of accomplishing the foregoing objects it is necessary to provide skilled laborers who wind the ends of the connecting wires about the cables to be connected and who then form a wipe joint of lead or solder about the portion of the connecting wires at their junction with the cables.

The present invention provides simple and efficient means for bonding cables without the use of skilled labor and comprises an open bottomed casing adapted to be seated upon the cables and to receive molten metal, said molten metal completing the joint as effectually as the wipe joint has heretofore done.

Further objects and advantages of the invention will be set forth in the detailed description which now follows.

In the accompanying drawing: Figure 1 is a perspective view of a plurality of my improved cable bonding devices applied to a plurality of cables. Fig. 2 is a perspective view of one of my improved cable bonding devices with a cable indicated in dotted lines, and Fig. 3 is a transverse vertical section of the device.

Like numerals designate corresponding parts in all of the figures of the drawing.

Referring to the drawing the numerals 5 designate the cables which it is desired to connect. Seated upon these cables are a plurality of open bottomed casings 6, comprising the side walls 7 and the end walls 8. The lower faces of these end walls are curved to conform to the curvature of the periphery of the cable by virtue of which the casings 6 sit closely upon the cables in such manner that said cables completely close the bottoms of the casings.

Formed integrally with each of the casings is a strap 9 which is adapted to encircle the cable. The free end of this strap passes up through the casing and upon the inner face of the side wall thereof. The casings and the straps are preferably formed of fusible metal such as lead or zinc. Bowed metallic connecting wires connect adjacent casings, the free ends of said wires passing longitudinally through the said casings.

The operation of the device is as follows: The casings are placed upon the cables and the straps are passed around the cables and their free ends passed upwardly upon the inside of said casings. The receptacles formed by said casings are then filled with molten lead or solder, indicated by the numerals 10. The filling of these receptacles with the heated metal causes a partial fusing of the casings and their retaining straps whereby the entire structure becomes an integral mass with the cable. The bowed connections not only permit of a limited movement of aerial cables with relation to each other but they permit the separation of the casings with relation to each other when it is desired to accommodate cables which are at varying distances apart.

From the foregoing description it will be seen that simple and efficient means are herein provided for accomplishing the objects of the invention but it is to be understood that said invention is not limited to the precise construction set forth but includes within its purview such changes as may be made within the scope of the appended claims:

Having described my invention what I claim is:—

1. In a device of the character described, the combination with a receptacle open at the top and at the bottom, the end walls of said receptacle being cut out to fit upon a cable, of a strap carried by said receptacle and adapted to secure said receptacle upon said cable.

2. In a device of the character described, the combination with a receptacle open at the top and at the bottom, the end walls of said receptacle being cut out to fit upon a cable, of a strap carried by said receptacle and adapted to secure said receptacle upon said cable, both the receptacle and the strap being formed of fusible metal.

3. In a device of the character described, the combination with a receptacle open at the top and at the bottom, the end walls of said receptacle being cut out to fit upon a cable, of a strap carried by said receptacle and adapted to secure said receptacle upon said cable, both the strap and the receptacle being formed of fusible material and the strap being adapted to pass around the cable and to extend up into the receptacle and lie close to one of the walls thereof.

4. In a cable bonding device, the combination with a plurality of receptacles open both at the top and at the bottom, the end walls of said receptacles being cut out to permit said receptacles to fit snugly upon electric cables, of bowed connecting devices, the free ends of which pass longitudinally through said receptacles.

5. In a cable bonding device, the combination with a plurality of receptacles open both at the top and at the bottom, the end walls of said receptacles being cut out to permit said receptacles to fit snugly upon electric cables, of bowed connecting devices, the free ends of which pass longitudinally through said receptacles, and straps carried by said receptacles and adapted to surround the cables and to extend up between said cables and one of the walls of the receptacles.

In testimony whereof I affix my signature in presence of two witnesses.

HARRY E. ADAMS.

Witnesses:
Wm. G. Walter,
Frank P. Hawley.